March 22, 1960  A. SILVERSTEIN  2,929,182
METHOD AND MEANS FOR SEALING PLASTIC TUBES
Filed Dec. 2, 1958  2 Sheets-Sheet 1

INVENTOR.
ABRAHAM SILVERSTEIN
BY
ATTORNEYS.

March 22, 1960 A. SILVERSTEIN 2,929,182
METHOD AND MEANS FOR SEALING PLASTIC TUBES
Filed Dec. 2, 1958 2 Sheets-Sheet 2

INVENTOR.
ABRAHAM SILVERSTEIN
BY
ATTORNEYS

United States Patent Office 2,929,182
Patented Mar. 22, 1960

2,929,182

METHOD AND MEANS FOR SEALING PLASTIC TUBES

Abraham Silverstein, Hyattsville, Md., assignor to the United States of America as represented by the Secretary of the Navy Application December 2, 1958, Serial No. 777,799

6 Claims. (Cl. 53—39)

(Granted under Title 35, U.S. Code (1952), sec. 266)

The invention described herein may be manufactured and used by or for the Government of the United States of America for governmental purposes without the payment of any royalties thereon or therefor.

This invention is a continuation in part of patent application Serial Number 526,338, filed August 3, 1955, now abandoned, for Method and Means for Sealing Plastic Tubes in the name of Abraham Silverstein and relates to the sealing of plastic containers of volatile fluids.

In some systems used to actuate mines an electrochemical control unit known as a solion is used. The solion is an electrochemical device based on the principle of concentration polarization. Essentially it is composed of a plastic container with flexible side walls and containing a solution of potassium iodide and iodine. Stimulation of the flexible side walls through heat, sound, pressure or motion causes a hydraulic flow within the container which results in a current flow. It is necessary that the interior of these plastic containers of the potassium iodide-iodine solution be entirely free of air. The potassium-iodide, iodine solution is a volatile solution which, if exposed to heat, would generate pressure sufficient to rupture the thin flexible walls. The problem of sealing these containers has been solved by the novel method of sealing which is the subject of this invention.

An object of the present invention is to provide a sealing method for plastic containers which will not apply heat to the fluid contents, which will positively seal, and will not introduce any air into the container.

A further object of the invention is to provide a method of sealing, without substantial distortion, the upper portion of a thin walled tube formed of a plastic having a high melting point.

It is a further object of the present invention to provide a support for a container, during a plastic plug insertion, and later for a filling tube, during a sealing operation and to provide heat sealing means which transfers the heat by radiation through the support to the specific parts of the tube and plug which should be fused and does not heat other parts of the tube which should not be heated.

Other objects and many of the attendant advantages of this invention will be readily appreciated as the same becomes better understood by reference to the following detailed description when considered in connection with the accompanying drawings wherein.

Figure 1:
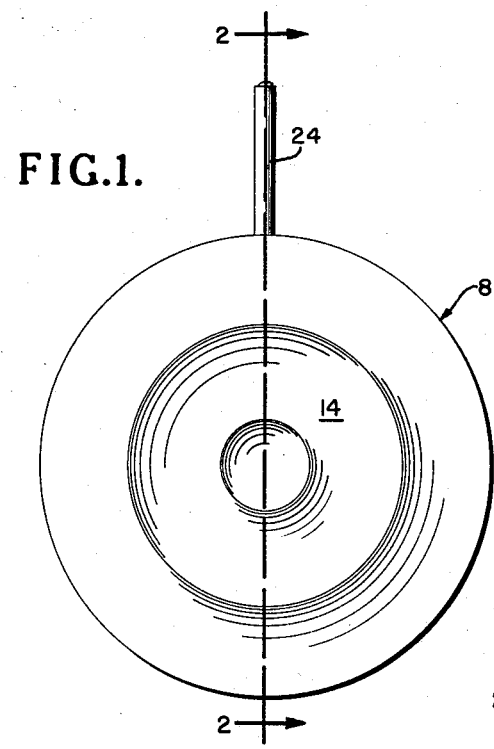
Fig. 1 is a side elevation of the plastic container.
Figure 2:
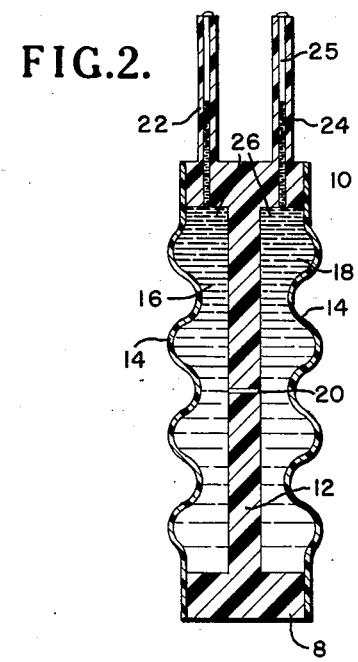
Fig. 2 is a section on line 2—2 of Fig. 1.

Referring particularly to Figs. 1 and 2 in which like parts are designated by like numerals, a plastic container 8 representing those portions of a solion necessary for the understanding of this invention is shown. All electrical units and connections are omitted as they form no part of this invention nor is there any need to illustrate them for a complete understanding thereof.

The solion 8 is formed of a plastic having a high melting point and the quality of not adhering to other surfaces such as Kel F and consists of a circular rim 10 of fairly heavy cross-section having a central web 12 and a pair of flexible side walls or diaphragms 14, forming two compartments 16 and 18 connected by a restricted opening 20 located in the central web 12, the flexibility of the side walls being much greater than the flexibility of the web. Flow of the fluids contained in the compartments 16 and 18 from one to the other due to pressure differential on the exterior surfaces of the diaphragms creates a flow of ions which is proportional to the pressure and causing a flow of electrical current through an external circuit.

The compartments 16 and 18 are filled with a highly volatile solution of potassium iodide and iodine, which solution extends completely up into a filling tube 22 connected to the compartment through the rim 10. The compartment 18 is provided with a similar tube 24 and as the tubes 16 and 18 and sealing process are identical and separately carried out only one of such processes will be described. It is essential that there be no air in either the compartments or the tubes during the filling operation and when the sealing process is completed.

Figure 3:
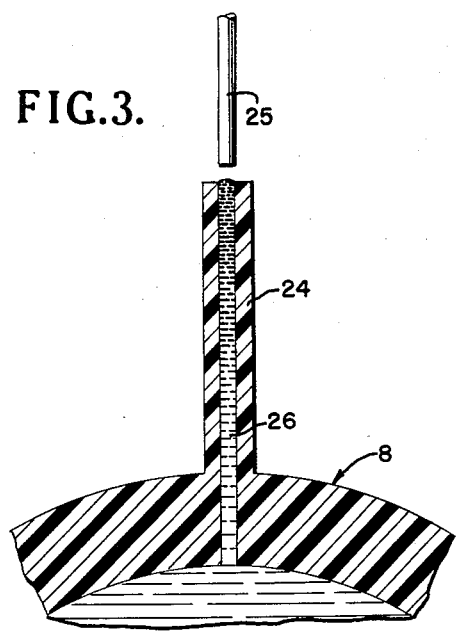
Fig. 3 is an enlarged sectional view of the tube of the container.
Figure 4:
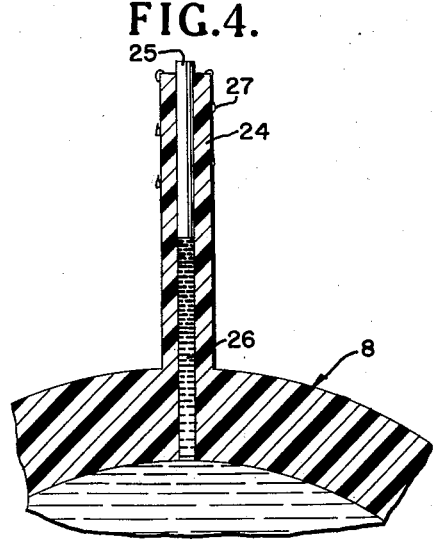
Fig. 4 is a view similar to Fig. 3 after the plug insertion.
Figure 5:
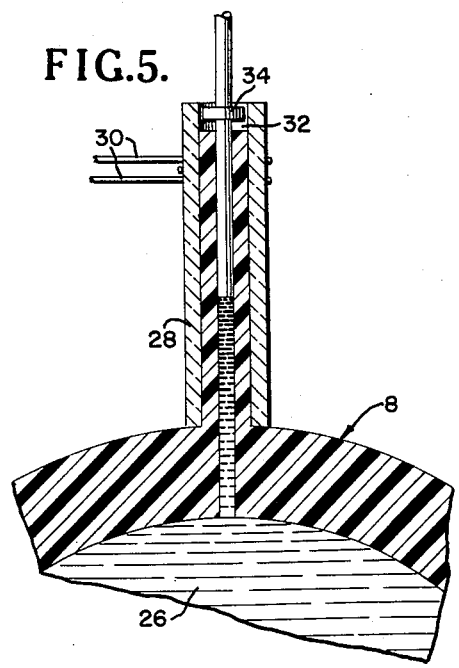
Fig. 5 is a view similar to Fig. 3 with the supporting sleeve and heating element in place.

Referring particularly to Figs. 3 and 4, the tube 10 is shown with a tight fitting plug 25 of the same material as the container.

Figure 7:
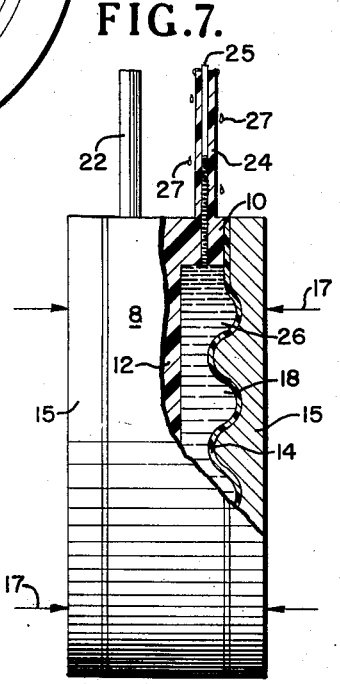
Fig. 7 is a side elevation, partly in section showing the bracing plates used in the plug insertion operation.

The plug 25 (Fig. 7) is inserted into filling tube which is integral with the container and which is completely filled with fluid. The diaphragms 14 are held in position by a pair of bracing plates 15 tightly pressed against the rim of the container by a force indicated by arrows 17. The bracing plates are formed with corrugation to fit the corrugations formed in the thin walled diaphragms 14. During the insertion of the plug a small portion of the fluid in the filling tube is spilled, indicated by the drops 27. This liquid is put into the container while the container is in a vacuum compartment and the spilling of the fluid rids the compartment of that fluid, which has been exposed to the air in the second it takes to remove the container from the compartment and insert the plug. The bracing plates insure a very precisely measured amount of fluid being in the container. This plug is put in the tube for more than ¾ of its length so that there is no air space between the plug and the liquid 26, and a glass sleeve 28 is fitted over the tube so as to furnish physical support for the tube during the sealing operation. The tube is thin walled and long in comparison with its diameter and the sleeve covers the tube entirely and projects a short distance beyond the tube to form a circular recess 32 between the sleeve and the plug which also projects a distance beyond the tube which is slightly less than the distance the sleeve projects beyond the tube.

A heating wire 30 is coiled about the sleeve slightly below the termination of the tube and well above the column of liquid in the tube. An electric current is passed through the wire which is heated to incandescence and radiates heat through the glass sleeve 28 to soften the tube and plug at this particular point and to soften the plastic. A rod 32 having a flat end 34 may be used to flatten the projecting end of the plug and by applying pressure to the end of the plug cause the tube and plug to be fused into one mass as indicated at 36 in Fig. 6 to completely seal the container without danger of volatilizing the liquid contents. The heat applied is intense and of short duration. It is applied to the upper end of a thin walled plastic tube and plug at such a distance from the liquid that substantially none of the heat is transferred to the liquid.

Figure 6:
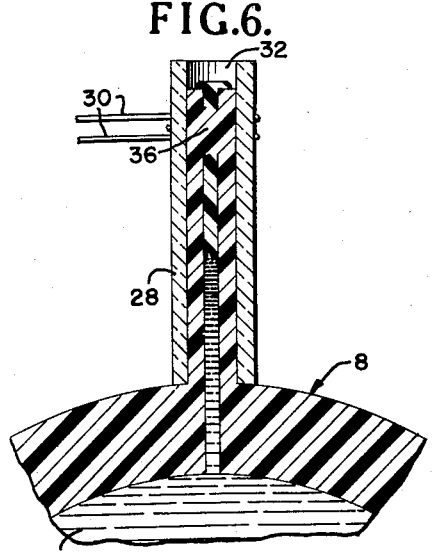
Fig. 6 is a view similar to Fig. 5 showing the fusing of the plug and tube.

Referring particularly to Fig. 6, it will be seen that the plastic tube and plug are heated to a high temperature which with the pressure exerted by the rod fuses the two together at this point. Both above and below the heating coil the tube and plug are heated only slightly and remain as separate units although the top of the plug softens sufficiently to permit flattening under pressure. The plastic Kel F is viscous, when heated, never really becoming liquid. The pressure exerted by the rod is necessary to fuse the tube and the plug into one solid mass to produce a seal which has depth. The plastic Kel F, like other plastics, expands under the application of heat and the tube and plug are probably forced upward in the supporting sleeve. This upward force is counteracted by the manually exerted pressure of the rod 32 to effectively seal the container.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A method of sealing a plastic container which is completely filled with a volatile liquid consisting in providing a substantially long thin filling tube adapted to be completely filled with liquid, inserting a plug in said tube and in contact with said liquid in such a manner as to avoid trapping any air between the plug and the liquid, physically supporting the tube throughout its length, and applying a radiant heat to the tube adjacent the end portion thereof remote from the container just sufficient to fuse said plug and said tube together to securely seal said container without imparting sufficient heat to volatilize the contents thereof.

2. A method of sealing a plastic container according to claim 1 and including the application of pressure to the heated plastic.

3. A method of sealing a plastic container according to claim 2 wherein the pressure is manually applied.

4. A method of sealing a plastic container according to claim 1 wherein the fused portion of the plug and tube is located near but not at the end portion of the tube.

5. A method of sealing a plastic container having an elongated filling tube and completely filled with a highly volatile liquid comprising inserting an elongated plug of the same plastic material as the container into the filled tube and overspilling the liquid until the plug is inserted in the tube for more than three-fourths of its length and applying a supporting glass tube completely over the filling tube and extending beyond the tube and the end of the plug, heating the tube and plug substantially along a diametric plane of the tube and plug to fuse said tube and plug together at this point other than the ends of the plug and tube to seal the container.

6. A method of sealing a plastic container according to claim 5 and including the flattening of the protruding end of the plug.

References Cited in the file of this patent
UNITED STATES PATENTS
2,304,521   Wuestman -------------- Dec. 8, 1942